United States Patent [19]

Melara

[11] 4,219,904
[45] Sep. 2, 1980

[54] SELF-ORIENTABLE WHEEL MECHANISM FOR FURNITURE

[75] Inventor: Francescantonio Melara, Bologna, Italy

[73] Assignee: Emilsider Meccanica S.n.c. di Melara Francescantonio & Co., Cadriano di Granarolo Emilia, Italy

[21] Appl. No.: 864,999

[22] Filed: Dec. 27, 1977

[30] Foreign Application Priority Data

Dec. 29, 1976 [IT] Italy .................................. 3632 A/76

[51] Int. Cl.² ............................................ B60B 33/00
[52] U.S. Cl. ...................................................... 16/47
[58] Field of Search ...................... 16/31 R, 47, 48, 45, 16/46, 18 R, 18 A

[56] References Cited

U.S. PATENT DOCUMENTS

| | | | |
|---|---|---|---|
| 2,458,922 | 1/1949 | Andresen | 16/48 X |
| 2,995,771 | 8/1961 | Mullikin | 16/31 R X |
| 3,161,907 | 12/1964 | Anthony | 16/18 A |
| 3,818,541 | 6/1974 | Daniels | 16/31 R X |
| 3,894,310 | 7/1975 | Screen et al. | 16/47 |
| 3,997,938 | 12/1976 | Pinaire et al. | 16/47 X |
| 4,024,601 | 5/1977 | Harlang | 16/47 X |
| 4,077,088 | 3/1978 | Melara | 16/47 |

FOREIGN PATENT DOCUMENTS 1329683 5/1963 France .................................. 16/18 A

*Primary Examiner*—Werner H. Schroeder
*Assistant Examiner*—Moshe I. Cohen
*Attorney, Agent, or Firm*—Guido Modiano; Albert Josif

[57] ABSTRACT

Two wheel castor for furniture, comprising a vertical wall, a shaped seat extending through the wall perpendicular thereto and defining front tubular projections on either sides of the wall. A shaft is supported in the seat and has its opposed ends projecting outside of the seat on either side thereof. A pair of wheels is pivotally secured to the opposed ends of the seat and has tubular hub portions provided with outer collars facing the projections of the seat. A sleeve is formed in the wall in the plane thereof and perpendicular and offset with respect to the seat. A pivot pin is journaled in the sleeve and is adapted to be inserted in a vertical socket of the article wherein the wheel mechanism is installed.

2 Claims, 5 Drawing Figures

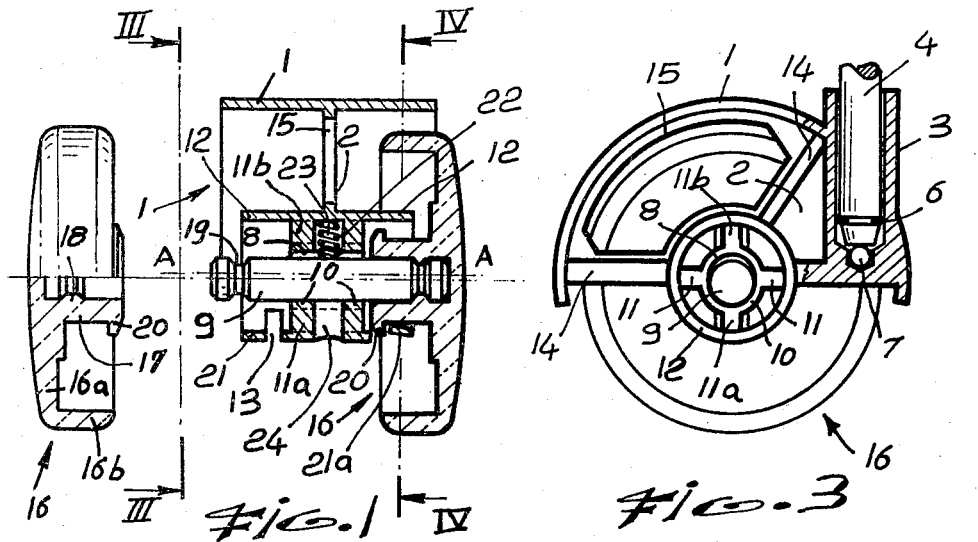
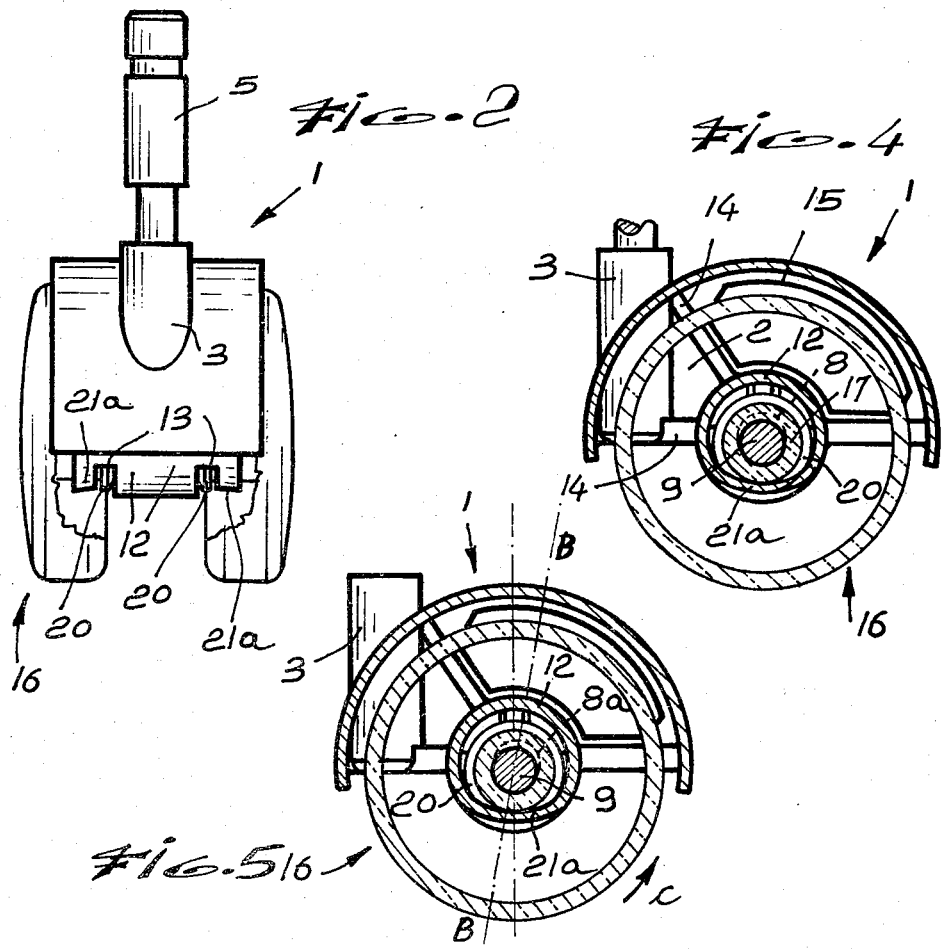

SELF-ORIENTABLE WHEEL MECHANISM FOR FURNITURE

BACKGROUND OF THE INVENTION

This invention relates to a two wheel castor for furniture, and in particular to a castor of the swivelling type.

In castors of the prior art, two wheels are pivotally mounted to the ends of a horizontal shaft which is affixed to a vertical portion of a housing, and after a short period of use of the castor, between the cited wheels and shaft, there collect threads, hairy matter and other difficult to remove materials which hinder the rotation of the wheels and hence the proper castor operation.

In applying castors to chairs, moreover, it has been found that problems and potential hazards, as due to inattention by users, may be eliminated if the rolling movement of such chairs on their castors is only permitted after the users have taken a sitting attitude, and is prevented while the users are not yet sitting on the chairs; specific safety standards as regard chair castors have already been set, for example, in the Federal Republic of Germany.

SUMMARY OF THE INVENTION

It is the problem whereupon this invention is based to make provision for preventing hairy matter, threads and the like debris from hindering the rotational movement of castor wheels, and ensuring protection from potential hazards arising from the application of such castors to chairs.

This object is achieved by the instant two wheel castor for furniture, comprising a vertical wall, a seat extending through said wall perpendicular thereto and defining front tubular projections on either side of said wall, a shaft supported in said seat and having its opposed ends projecting outside of said seat on either side thereof, a pair of wheels pivotally secured to said opposed ends and having tubular hubs provided with outer collars close to said projections, a sleeve formed in said wall in the plane thereof and perpendicular and offset with respect to said seat, a pivot pin journaled in said sleeve and adapted to be inserted in a vertical socket of an article of furniture to which the castor is to be fitted front bushings defined on either side of said wall and disposed around said projections such as to accomodate said hubs slots cut at the lower area of said bushings and extending along an arc of a circle and defining ring portions between said slots and free ends of said bushings, said ring portions being deformed for engagement behind said collars to retain said wheels axially, a vertical hole formed in said wall and communicating with said seat, elastic means arranged in said hole and acting on said shaft, said seat being elongated in a substantially vertical plane thus permitting friction contact of said hubs with said deformed ring portions when the castor is in unloaded condition and free rotation of the hubs when the castor is in loaded condition.

BRIEF DESCRIPTION OF THE DRAWING

Further features of the invention will be better understood by considering the following detailed description of preferred, though not restrictive, embodiments thereof, illustrated by way of example and not of limitation in the accompanying drawing, where:

FIG. 1 is a vertical axial section view of a two wheel castor at an assembling stage thereof, one of the wheels being yet to be assembled thereto;

FIG. 2 is a side elevational view of the assembled castor, the twin wheels being partly cut away;

FIG. 3 is a vertical sectional view of the castor taken along the line III—III of FIG. 1;

FIG. 4 is a vertical sectional view taken along the line IV—IV of FIG. 1; and

FIG. 5, in a sectional view similar to FIG. 4, showing a second embodiment of the wheel mechanism according to the invention.

DESCRIPTION OF THE PREFERRED EMBODIMENTS

Making reference to such figures, the numeral 1 denotes the shaped housing or fairing of the two wheel castor, which forms little more than one half of a cylinder lateral surface, having a horizontal axis A—A and its convex side facing upwards. Within the concave side of the housing 1, there is located a wall 2 formed integral with the housing and located in the center plane of the housing, and which, being perpendicular to the axis A—A, extends vertically. In the wall 2 is formed a sort of vertical sleeve 3, which extends above the housing and is internally tangent thereto, thus being located at a distance from the axis A—A. The vertical pivot pin 4 of the castor assembly is journaled in the sleeve 3. The portion 5 which the vertical pivot pin 4 presents above the sleeve 3, is adapted to be inserted in a socket of a piece of furniture, specifically a chair, whereto the castor is to be installed. The pin 4 is provided at the bottom with a groove accomodating a snap ring 6 for ritention of the pin within the sleeve 3. At the sleeve 3 bottom, there is provided a seat wherein a ball 7 is retained by press fit, whereon rests pivotally the lower end of the vertical pivot pin 4. At the axis A—A, the wall 2 has a through seat 8, through which a shaft 9 extends. The through seat 8 is defined by a pair of tubular projections 10, which project from both sides of the wall 2. Outwardly with respect to the two tubular projections 10 there extend radially, two horizontal ribs 11 and two vertical ribs 11a and 11b. The rib 11a is located below the projections 10 and the rib 11b is located above them. The ribs 11, 11a and 11b have the same axial length of the projection pair 10 and join the latter to a pair of bushings 12, also extending from both sides of the wall 2 and surrounding the projections 10. The bushings 12 are co-axial with the axis A—A, and in the direction of this axis extend beyond the ends of the projections 11, 11a and 11b. Close to either free end of the bushings 12, respective slots 13 are cut which extend along an arc of a circle at the lower area of the same bushings 12 and define deformable ring portion 21. Outwardly with respect to the bushings 12, the vertical wall 2 is stiffened by radial ribs 14 and has an opening 15 for lightening purposes. The two ends of the shaft 9 project beyond the free ends of the tubular projections 10 and bushings 12. Twin wheels 16 are secured pivotally to the ends of the shaft 9. Each wheel includes a circular wall 16a, of solid construction and slightly cambered outwardly, and a peripheral rim 16b projecting inwardly. At the center of the wall 16a, each wheel is provided with a tubular hub 17, which is fitted on the corresponding end of the shaft 9 by an annular lug 18 which engages an annular groove 19, formed in each end of the shaft 9. Obviously, such a lug may also be provided in the shaft and the groove formed in the wheel hub. The hub 17 of each wheel 16 terminates in an outer collar 20. The collars 20 have a diameter such that they may be lodged within the bushings 12. Futhermore the width of the collars is slightly smaller than that of the slots. In this way by deforming the ring portions 21 behind the collars 20 the wheels 16 are retained in an axial direction. The ring portions 21, after being deformed are indicated at 21a, and slightly diverge outwardly.

Inside the rib 11b, a vertical hole 22 is drilled which opens at the bottom to the seat 8 and is located at the center of the rib. A spring 23 is received in the hole 22. A through hole 24 is drilled through the ribs 11a, which is in alignment with the hole 22 to allow the spring to be introduced in the hole 22 itself, while the shaft 9 is not yet inserted in the seat 8. The spring acts on the shaft 9 urging it downwards. Furthermore the spring engages the shaft 9 frictionally in order to prevent the shaft from rotating in the seat 8. Obviously, the spring 23 could be replaced by a cylinder of an elastic material.

The seat 8 is slightly elongated in a plane perpendicular to the wall 2; in the embodiment of FIGS. 1—3 and 4, that plane is vertical; in FIG. 5, the seat is indicated at 8a, and slightly inclined from the vertical as indicated by the line B—B such as to be convergent to the downward prolongation of the axis of the pin 4.

The instant two wheel castor or castor operates as follows.

When the castor is mounted to a chair and the user is not sitting in said chair, the spring 23, acting on the shaft 9, keeps the latter in contact with the bottom of the seat, 8 or 8a. The hub portions 17-20 of the wheels 16 are thus in friction contact with the deformed ring portions 21a. It should be pointed out here that, in the case of the vertically elongated seat 8, the portion of the hub 17 next to the collar 20 has its lower area in sliding contact with the lower portion of the clamped portion 21a; the portion 21a being divergent outwardly, the contact actually occurs at the uppermost inner edge of the portion 21a. Whereas, in the case of the inclined seat 8a, the collar 20 is in friction contact with the end of the slot 13 near the sleeve 3. Owing to the fact that the castor rotates around the pivot pin 4 and the wheels are obliged to rotate only in the normal direction C. The wheels, being braked by said friction contact, do not permit the chair to be rolled along under the effect of a small push applied inadvertently, and the chair rolling movement can only occur by applying a strong and deliberate push thereto.

On the contrary when the user is sitting in the chair, the user's weight causes the spring 23 to be compressed, so that no friction contact occurs between the hubs 17-20 and the deformed ring portions, and the user may roll the chair as desired. It should be noted that the shaft 9 may swing in the plane of the seat 8 so that contact of both wheels 16 with the surface whereon the chair is resting is ensured even when that surface is not perfectly smooth and has some irregularities.

The bushings 12 cover both the hubs 17 of the two wheels 16 and the pivot pin 9, thus preventing hairy matter, threads and the like, to pentrate between its rotating parts and affording long life of the castor.

It is preferred that the housing 1 and other parts integral therewith (2, 10, 12) are die cast from a light alloy material.

I claim:

1. A two wheel castor for furniture, comprising a vertical wall, a seat extending through said wall perpendicularly thereto and defining front tubular projections on either side of said wall, a shaft supported in said seat and having its opposed ends projecting outside of said seat on either side thereof, a pair of wheels pivotally secured to said opposed ends and having tubular hubs provided with outer collars close to said projections, a sleeve formed in said wall in the plane thereof and perpendicular and offset with respect to said seat, a pivot pin journaled in said sleeve and adapted to be inserted in a vertical socket of an article of furniture to which the castor is to be fitted, front bushings defined on either side of said wall and disposed around said projections such as to accomodate said hub slots cut at the lower area of said bushings and extending along an arc of a circle and defining ring portions between said slots and free ends of said bushings, said ring portions being deformed for engagement behind said collars such as to retain said wheels axially, a vertical hole formed in said wall and communicating with said seat, elastic means arranged in said hole and acting on said shaft, said seat being elongated in a substantially vertical plane thus permitting friction contact of said hubs with said deformed ring portions when the castor is in unloaded condition and free rotation of the hubs when the castor is in loaded condition.

2. A castor according to claim 1, characterized in that said slots have dimensions for receiving portions of said collars so that said elastic means urge said collars in engagement with the opposite ends of said slots when the castor is in unloaded condition.

* * * * *